United States Patent Office 3,399,138
Patented Aug. 27, 1968

3,399,138
TRIAZINES
Billy Dale Vineyard, St. Louis, Mo., assignor to Monsanto Company, St. Louis, Mo., a corporation of Delaware
No Drawing. Continuation-in-part of application Ser. No. 502,405, Oct. 22, 1965. This application Oct. 11, 1967, Ser. No. 674,656
7 Claims. (Cl. 252—33.6)

ABSTRACT OF THE DISCLOSURE

Lubricating oil compositions which exhibit detergent properties by the incorporation into a lubricating oil of certain triazine compounds which can be derived from polyalkenylsuccinic acids and dicyandiamide. The lubricating oil compositions have many uses among which are lubrication of internal combustion engines.

This application is a continuation-in-part of Ser. No. 502,405, filed Oct. 22, 1965 and now abandoned.

This invention relates to certain novel triazines and to lubricating oil compositions containing such triazines having improved detergent properties.

Under the conditions encountered in a large percentage of present-day automobile driving (i.e., the so-called stop-and-go driving), automobile engines do not attain their most desirable and efficient operating temperatures. As a result, large quantities of oil-insoluble oxidation products are formed which eventually find their way into the crankcase, where they tend to build up on the internal parts of the engine, resulting in further inefficient engine operation. In present-day practice, deposition of oxidation products is minimized by incorporating into lubricating oils metal-containing detergents. The use of metal-containing detergents has not been totally satisfactory, however, since such detergents form ash deposits in the combustion chambers of engines, fouling the spark plugs and creating other problems. Accordingly, it is the desire of those working in the art to find suitable detergents which are metal-free.

It has now been found that certain triazines are useful as metal-free or ashless detergents in lubricating oil compositions. More particularly, the novel triazines of this invention, which are symmetrical 1,3,5-triazines, can be represented by the structure

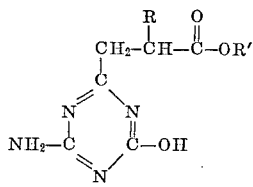

where R is a polyalkenyl radical having a molecular weight of from about 800 to about 2500, preferably from about 1100 to about 2000 and R' is selected from the group consisting of hydrogen, a hydrocarbon radical and a quaternary ammonium, Group I or Group II metal cation.

The new triazines of this invention can be prepared by reacting a polyalkenylsuccinic acid, represented by the structure

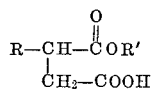

where R and R' have the aforedescribed significance, with dicyandiamide (cyanoguanidine),

More particularly, the preferred method of preparation involves the steps of:

(1) preparing a polyalkenylsuccinic anhydride by reacting maleic anhydride with an olefin polymer (e.g., polymers of ethylene, propylene, butylene, isobutylene and mixtures thereof) at temperatures of about 150° C. to 250° C. in molar ratios of from about 1:1 to about 5:1, respectively, (2) hydrolyzing the anhydride from Step 1 by heating it with water to form a polyalkenylsuccinic acid, (3) reacting the acid from Step 2 with dicyandiamide while removing the water of reaction to form the 1,3,5-triazines of this invention.

It has also been found, however, that Steps 2 and 3 can be combined to the extent that dicyandiamide can be reacted with the anhydride from Step 1 in the presence of water in an amount sufficient to initiate the reaction. This is possible probably because once the reaction is initiated, water generated by the formation of triazines serves to hydrolyze the anhydride to acid. Of course, when Steps 2 and 3 are combined, water is not azeotropically removed as in Step 3. It is also preferred to conduct Step 3 in a water-immiscible hydrocarbon solvent in order to reduce the amount of time involved to complete the reaction. Suitable hydrocarbon solvents are, for example, aromatic hydrocarbons such as benzene, toluene and xylene and aliphatic hydrocarbons. In analyzing the triazines of this invention, it has been found that minor amounts of other products are present but such products can be allowed to remain since they do not harmfully affect the detergent properties of the triazines.

The temperatures employed in Step 3 or combined Steps 2 and 3 range from about 50° C. to 60° C. and up, the speed of the reaction being dependent upon the temperatures used. As a practical matter, temperatures beyond 200° C. would not be used. Preferably the reaction is conducted at temperatures on the order of 110° C.–150° C., such temperatures affording good reaction rates. When R' is a hydrocarbon radical it is preferred that there is present from 1 to about 30 carbon atoms and within this range it is more particularly preferred that the number of carbon atoms be from about 1 to about 8 carbon atoms.

Typical examples of aliphatic radicals such as alkyl are methyl, ethyl, propyl, isopropyl, butyl, tert-butyl, amyl, hexyl, n-hexyl, sec-hexyl, 2,2-dimethyl-3 - butyl, 2,2 - dimethyl-4-butyl, 2,3,-dimethyl-2-butyl, 2-methyl-1-pentyl, 2-methyl-2-pentyl, 3-methyl-1-pentyl, 3-methyl-2-pentyl; heptyl, n-heptyl, sec-heptyl, 2,3-dimethyl-3-pentyl, 2,4-dimethyl-2-pentyl, 2,4-dimethyl-3-pentyl-2,2,3 - trimethyl-3-butyl, 3-ethyl-2-pentyl, 2-methyl-2-hexyl; octyl, n-octyl, 2-ethylhexyl, diisobutyl, capril; nonyl, diisobutylcarbinyl, n-nonyl, decyl radicals, e.g., n-decyl, dodecyl radicals, e.g., lauryl, tetradecyl radicals, e.g., myristyl, hexadecyl radicals, e.g., cetyl; octadecyl, alkyl radicals having the formula $C_nH_{2n+1}$ where $n$ is an integer from 18 to 38 inclusive, e.g., those derived from paraffin wax, mineral oils and petrolatum; alkenyl, examples of which are vinyl, propenyl radicals, e.g., allyl, isopropenyl; butenyl radicals, e.g., n-butenyl-1, n-butenyl-2, n-butenyl-3, isobutenyl; pentenyl radicals, e.g., n-pentenyl-1, n-pentenyl-2, n-pentenyl-3; hexenyl radicals, e.g., n-hexenyl-1, n-hexenyl-2, 4,4-dimethylbutenyl-2, 3,4 - dimethylbutenyl - 1, heptenyl radicals, e.g., n-heptenyl, octenyl radicals, n-octenyl, diisobutenyl, nonenyl radicals, e.g., n-nonenyl, decenyl radicals, e.g., n-decenyl, dodecenyl radicals, e.g., n-dodecenyl, triisobutenyl; cycloaliphatic, examples of which are cycloalkyl radicals, e.g., cyclopentyl, alkylated-cyclopentyl, cyclohexyl and alkylated-cyclohexyl radicals, e.g., mono- and polymethylcyclopentyl radicals, mono- and polymethylcyclohexyl radicals, mono- and polyethylcyclohexyl radicals, mono- and polyisopropylcyclohexyl radicals, mono- and poly-tert-amylcyclohexyl radicals, n-octylcyclohexyl radicals, diisobutylcyclohexyl (i.e., "tert-octyl"-cyclohexyl) radicals, nonylcyclohexyl radicals, diisoamylcyclohexyl radicals, laurylcyclohexyl radicals, cetylcyclohexyl radicals, naphthenyl radicals, hydrobietyl radicals; cycloalkenyl radicals, e.g., cyclopentenyl, alkylated-cyclopentenyl, cyclohexenyl and alkylated-cyclohexenyl radicals, e.g., mono- and polymethylcyclopentenyl radicals, mono- and polymethylcyclohexenyl radicals, mono- and polyethylcyclohexenyl radicals, mono- and polyisopropylcyclohexenyl radicals, mono- and poly-tert-amylcyclohexenyl radicals, n-octylcyclohexenyl radicals, diisobutylcyclohexenyl radicals, nonylcyclohexenyl radicals, diisoamylcyclohexenyl radicals, laurylcyclohexenyl radicals, cetylcyclohexenyl radicals; dehydronaphthenyl radicals; abietyl radicals; aryl- and cycloalkyl-substituted aliphatic radicals, e.g., phenyl- and alkylphenyl-substituted alkyl radicals, e.g., benzyl methylbenzyl, caprylbenzyl, diisobutylbenzyl, phenylethyl, phenylpropyl, phenyloctadecyl; xenyl- and alkylxenyl-substituted alkyl radicals, e.g., xenylmerthyl, caprylxenylmethyl, xenylethyl, diisobutylxenylmethyl; naphthyl- and alkylnaphthyl-substituted alkyl radicals, e.g., naphthylmethyl, tert-amylnaphthylmethyl, naphthylethyl, octylnaphthylethyl; cyclohexyl- and alkylcyclohexyl-substituted alkyl radicals, e.g., cyclohexylethyl, methylcyclohexylethyl, ethylcyclohexylethyl, cyclohexylpropyl, tert-amylcyclohexylbutyl; oxygen-containing aliphatic and cycloaliphatic radicals, e.g., oxygen-containing aliphatic radicals, e.g., alkoxy-substituted alkyl radicals, e.g., propoxyethyl radicals, e.g., n-propoxyethyl, isopropoxyethyl; butoxyethyl radicals, e.g., n-butoxyethyl, isobutoxyethyl, tert-butoxyethyl; octoxyethyl radicals, e.g., n-octoxyethyl, diisobutoxyethyl; dibutoxypropyl radicals, e.g., 2,3-di-n-butoxypropyl, 3,3-diisobutoxypropyl; dioctoxypropyl, 2,3-bis(diisobutoxy)propyl; cycloalkoxy-substituted alkyl radicals, e.g., cyclohexoxymethyl, cyclohexoxyethyl radicals, e.g., beta-cyclohexoxyethyl, alphacyclohexoxyethyl; cyclohexoxybutyl radicals, e.g., 2-(cyclohexoxy)butyl, 2,3-dicyclohexoxybutyl; methylcyclohexoxypropyl radicals, e.g., 2-(o-methylcyclohexoxy)propyl, 2-(p-methylcyclohexoxy)propyl; butylcyclohexoxyethyl radicals, e.g., beta-(p-butylcyclohexoxy)ethyl, alpha-(sec-butylcyclohexoxy)-ethyl; cyclopentoxyethyl radicals, e.g., alpha-cyclopentoxyethyl, betacyclopentoxyethyl; propylcyclopentoxymethyl radicals, e.g., isopropylcyclopentoxymethyl radicals, n-propylcyclopentoxymethyl radicals; alkenoxy-substituted alkyl radicals, e.g., propenoxyethyl radicals, e.g., allyloxyethyl, isopropenoxyethyl; octenoxyethyl radicals, e.g., diisobutenoxyethyl, dioctenoxypropyl radicals, e.g., 2,3-bis(diisobutenoxy)propyl; epoxyalkyl radicals, e.g., epoxypropyl, epoxybutyl radicals, e.g., 2,3-epoxy-n-butyl, 3,4-epoxy-n-butyl; carboalkoxyalkyl radicals

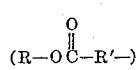
(R—O—C—R'—)

e.g., carbomethoxymethyl

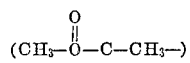
(CH₃—O—C—CH₃—)

carboethoxyethyl, carbolauroxyethyl; aroxy-substituted alkyl radicals, for example, phenoxy- and alkylphenoxy-substituted alkyl radicals, e.g., phenoxymethyl, phenoxyethyl, cetylphenoxyethyl, phenoxyphenethyl, caprylphenoxyphenethyl; oxygen-containing cycloaliphatic radicals, e.g., alkoxy-, alkenoxy- and aroxy-substituted cycloalkyl radicals, e.g., alkoxy-substituted cyclopentyl radicals, e.g., mono- and polyethoxycyclopentenyl, octoxycyclopentyl radicals, e.g., diisobutoxycyclopentyl; alkoxy-substituted cyclohexyl radicals, e.g., mono- and polymethoxycyclohexyl, octoxycyclohexyl radicals, e.g., diisobutoxycyclohexyl, alkenoxy-substituted cyclopentyl radicals, e.g., propenoxycyclopentyl radicals, e.g., allyloxycyclopentyl, isopropenoxycyclohexyl, octenoxycyclohexyl radicals, e.g., diisobutenoxycyclohexyl; aroxy-substituted cyclopentyl radicals, e.g., phenoxycyclopentyl, polyphenoxycyclopentyl radicals, e.g., diphenoxycyclopentyl radicals, tetraphenoxycyclopentyl radicals, ethylphenoxycyclopentyl radicals, e.g., o-ethylphenoxycyclopentyl, p-ethylphenoxycyclopentyl, naphthoxycyclopentyl; amylnaphthylcyclopentyl radicals, e.g., tert-amyl-alpha-naphthoxycyclopentyl radicals, n-amyl-beta-naphthoxycyclopentyl radicals; aroxy-substituted cyclohexyl radicals, e.g., diphenoxycyclohexyl radicals, triphenoxycyclohexyl radicals, butylphenoxycyclohexyl radicals, e.g., p-tert-butylphenoxycyclohexyl, n-butylphenoxycyclohexyl; naphthoxycyclohexyl radicals, e.g., alpha-naphthoxycyclohexyl, beta-naphthoxycyclohexyl, methylnaphthoxycyclohexyl radicals; propylnaphthoxycyclohexyl radicals, e.g., isopropyl-alpha-naphthoxycyclohexyl radicals, n-propyl-beta-naphthoxycyclohexyl radicals; epoxycycloalkyl radicals, e.g., epoxycyclopentyl, epoxycyclohexyl; carboalkoxycycloalkyl radicals, e.g., carboethoxycyclopentyl, carbomethoxycyclohexyl, carbolauroxycyclohexyl; aliphatic and cycloaliphatic radicals containing inorganic elements, examples of which are halogens, metals, metalloids, e.g., selenium, silicon, sulfur; examples of such radicals are aliphatic radicals containing inorganic elements, e.g., alkyl radicals containing halogen, e.g., 2-fluoroethyl, 2-chloroethyl, 2-iodoethyl; chloropentyl radicals, e.g., 5-chloro-n-pentyl, 3,5-dichloro-n-octyl, alkenyl radicals containing halogen, e.g., chloropropenyl radicals, e.g., 3-bromo-n-octyl, 3,4-dibromo-n-octyl; alkenyl radicals containing halogen, e.g., chloropropenyl radicals, e.g., 5-chloro-n-pentyl, 3,5-dichloro-n-pentyl; bromooctyl radicals, e.g., 3-bromo-n-octyl, 3,4-dibromo-n-octyl; alkenyl radicals containing halogen, e.g., chloropropenyl radicals, e.g., 2-chloroallyl, chloroisopropenyl; bromobutenyl radicals, e.g., 4-bromocrotyl, 4,4-dibromocrotyl; chlorooctenyl radicals e.g., mono- and polychlorodiisobutenyl; alkyl radicals containing metal, e.g., radicals derived from metal alkoxides, e.g., M—O—(CH₂)₈—, M—O—(CH₂)₁₆ radicals derived from metal alkylcarboxylates, e.g.,

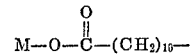

in which M represents one equivalent of a metal, examples of which are the alkali metals, the alkaline earth metals, copper, silver, zinc, aluminum, cobalt, nickel, tin and lead; alkyl radicals containing sulfur, e.g., $$C_2H_5—S—CH_2CH_2—$$

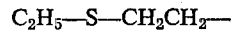

$C_2H_5—S_2—C_2H_4$, $C_4H_9—S_2—C_4H_8$, $C_8H_{17}—S_2—C_8H_{16}$; alkyl radicals containing selenium, e.g., $$C_2H_5—Se—CH_2CH_2—$$

$C_4H_9—Se—C_4H_8$; cycloaliphatic radicals containing inorganic elements, e.g., cycloalkyl- and alkylatedcycloalkyl radicals containing halogen, e.g., mono- and polychlorocyclopentyl, mono- and polychloromethylcyclohexyl, 4-tert-amyl-2,6-dibromocyclohexyl, 4-capryl-2-fluorocyclohexyl, 4-diisobutyl-2-iodocyclohexyl; cycloalkenyl- and alkylated cycloalkenyl radicals containing halogen, e.g., mono- and polychlorocyclopentenyl, mono- and polychloromethylcyclohexenyl, 4-tert-butyl-2-bromocyclohexenyl, 4-capryl-2-fluorocyclohexenyl, 4-diisobutyl-2-iodocyclohexenyl; cycloalkyl radicals containing metal, e.g., radicals derived from metal cycloalkoxides; radicals obtained on the removal of a hydrogen atom from the cycloaliphatic nucleus of, e.g., potassium cycloalkoxide of petroleum naphthenyl alcohol, lithium cycloalkoxide of hydroabietyl alcohol; radicals derived from methyl cycloalkylcarboxylates, e.g.,

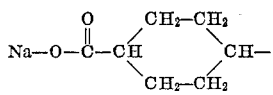

radicals obtained on the removal of a hydrogen atom from the cycloaliphatic nucleus of, e.g., sodium salt of petroleum naphthenic acids, lithium salt of hydroabietic acid; cycloalkyl radicals containing sulfur, e.g.,

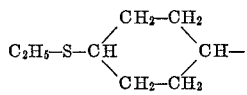

radicals obtained on the removal of a hydrogen atom from the cycloaliphatic nucleus of amyl thiolnaphthenate; aryl, herein defined to include mono-, di- and polynuclear hydrocarbons, such as phenyl, naphthyl and anthryl, typical examples of which are phenyl, cresyl, xylyl, mesityl, ethylphenyl, diethylphenyl, isopropylphenyl, n-propylphenyl, tert-butylphenyl, di-tert-butyphenyl, isobutylphenyl, n-butylphenyl, tert-amylphenyl, cyclohexylphenyl, methylcyclohexylphenyl, caprylphenyl, diisobutyphenyl, laurylphenyl, cetylphenyl, paraffin wax-substituted phenyl, nitrophenyl, monochlorophenyl, polychlorophenyl, e.g., dichlorophenyl, trichlorophenyl, hydroxyphenyl, acetylphenyl, carbolauroxyphenyl, lauroxyphenyl, xenyl, mono- and polychloroxenyl, caprylxenyl, phenoxyphenyl, thiophenoxyphenyl, diisobutylphenoxyphenyl, naphthyl, mono- and polychloronaphthyl, cetylnaphthyl, anthracyl, mono- and polychloroanthracyl, phenanthryl, mono- and polychlorophenanthryl, laurylphenanthryl,

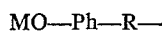

where M is one equivalent of a metal, Ph is the benzene ring and R is a divalent aliphatic radical, e.g., alkylene radicals, e.g., methylene, ethylene, propylene; alkylhydroxyaryl radicals, e.g., monomethylhydroxyphenyl radicals, polymethylhydroxyphenyl radicals, e.g., dimethylhydroxyphenyl radicals, trimethylhydroxyphenyl radicals; monoethylhydroxyphenyl radicals; polyethylhydroxyphenyl radicals; diethylhydroxyphenyl radicals, triethylhydroxyphenyl radicals; monobutylhydroxyphenyl radicals, e.g., tert-butylhydroxyphenyl radicals, sec-butylhydroxyphenyl radicals; polybutenylhydroxyphenyl radicals, e.g., di-tert-butylhydroxyphenyl radicals, monomethyldihydroxyphenyl radicals; polymethyldihydroxyphenyl radicals, e.g., dimethyldihydroxyphenyl radicals, trimethyldihydroxyphenyl radicals; monopropylhydroxynaphthyl radicals, e.g., monoisopropyl-alpha-hydroxynaphthyl radicals; polypropylhydroxynaphthyl radicals, e.g., di-n-propyl-beta-hydroxynaphthyl radicals; alkylchloroaryl radicals, e.g., methylmonochlorophenyl radicals, methylpolychlorophenyl radicals, e.g., methyldichlorophenyl radicals, methyltrichlorophenyl radicals; ethylmonochloroanthracyl radicals, e.g., ethylmonochloro-alpha-anthracyl radicals, triethylmonochloro-beta-anthracyl radicals; ethylpolychloroanthracyl radicals, e.g., ethyldichloro-alpha-anthracyl radicals, diethyltrichloro-beta-anthracyl radicals; alkylnitroaryl radicals, e.g., methylnitrophenyl radicals, dimethylnitrophenyl radicals, ethyldinitrophenyl radicals, butylnitronaphthyl radicals, e.g., tert-butylnitronaphthyl radicals, sec-butyldinitronaphthyl radicals, propylnitrophenanthryl radicals, e.g., isopropyldinitrophenanthryl radicals, di-n-propyldinitrophenanthryl radicals, mono- and polyhydroxyphenyl, dialkylaminophenyl, mono- and polyacylaryl, hydroxy- and acyl-substituted aryl, cyanophenyl, alkylcyanophenyl, butylcyanonaphthyl, phenoxyphenyl, tert-butylphenoxyphenyl, dialkylaminophenyl and the like; and the aforedescribed groups further substituted with a heterocyclic group containing from 4 to 10 atoms optionally interrupted by from 1 to 4 hetero atoms, which can be nitrogen, sulfur or oxygen or combinations thereof, such as substituted and unsubstituted pyridyl and the like.

Typical examples of quaternary ammonium, Group I metal and Group II metal cations are ammonium, quaternary methyl ammonium, quaternary ethyl ammonium, quaternary propyl ammonium and quaternary alkyl ammonium cations wherein the alkyl group has from 1 to 18 carbon atoms, lithium, sodium, potassium and rubidium, magnesium, calcium, barium, zinc and cadmium and the alkaline earth metal anions having a higher basicity than the neutral alkaline earth metal salt. Examples of the higher basic salts formed from alkaline earth metals are those salts which are prepared by carbonating a compound of this invention wherein R' is an alkaline earth metal in the presence of an excess amount of an alkaline earth metal wherein an inorganic acidic material is passed through the reaction mass to produce an overbased material. The term "Group II metal ion" wherein the Group II metal is an alkaline earth encompasses generically these overbased alkaline earth metal salts. The procedure that is utilized to prepare these overbased alkaline earth metal salts is well illustrated by U.S. 3,312,618 which illustrates various acidic materials which can be utilized such as carbon dioxide and the process conditions for preparing the overbased compounds of this invention.

In naming the triazines of the present invention, the system has been adopted of designating the approximate molecular weight of the polyalkenyl radical by a number in parentheses after the name of the polyalkenyl radical in a particular compound. Thus, typical examples of the triazines of this invention are:

2-[3-(2-polybutenyl (880) propionic acid)]-4-hydroxy-6-amino-1,3,5-triazine,
2-[3-(2-polyethenyl (1000) propionic acid)]-4-hydroxy-6-amino-1,3,5-triazine,
2-[3-(2-polypropenyl (about 980) propionic acid)]-4-hydroxy-6-amino-1,3,5-triazine,
2-[3-(2-polybutenyl (900) propionic acid)]-4-hydroxy-6-amino-1,3,5-triazine,
2-[3-(2-polybutenyl (1300) propionic acid)]-4-hydroxy-6-amino-1,3,5-triazine,
2-[3-(2-polybutenyl (1500) propionic acid)]-4-hydroxy-6-amino-1,3,5-triazine.

The preparation of typical 1,3,5-triazines of this invention is illustrated in the following non-limiting examples, wherein parts are parts by weight unless otherwise stated.

EXAMPLE 1

Into a suitable reaction vessel fitted with a mechanical stirrer, heating mantle, thermometer, Dean-Stark trap and condenser, containing 304 parts of polybutneyl (980) succinic acid in xylene, there is charged 19.7 parts of dicyandiamide and the resulting mixture is heated to reflux (about 145° C.) for about 6 hours, while azeotropically removing the water of the reaction. Thereafter, the xylene is stripped under vacuum to provide the product 2-[3-(2-polybutenyl (980) propionic acid)]-4-hydroxy-6-amino-1,3,5-triazine, which analyzed 3% nitrogen.

EXAMPLE 2

In the manner of Example 1, 2-[3-(2-polybutenyl (1300) propionic acid)]-4-hydroxy - 6 - amino - 1,3,5-triazine is prepared by reacting 200 parts of polybutenyl (1300) succinic acid in toluene with 9.2 parts of dicyandiamide at 120° C.–125° C. for 8 hours. The product analyzed 2.52% nitrogen.

EXAMPLE 3

Into a suitable reaction vessel fitted as described in Example 1 (except for the Dean-Stark trap), a mixture of 200 parts of polybutenyl (1350) succinic acid, 13.2 parts of dicyandiamide and 150 cc. of xylene is heated at about 110° C. for approximately 9 hours, after which the temperature is raised to 125° C.–130° C. for about 2 hours, after which time the reaction mixture is practically clear. Xylene is then stripped under vacuum to leave the product 2-[3-(2-polybutneyl (1350) propionic acid)]-4-hydroxy-6-amino-1,3,5-triazine, which analyzed 3.1% nitrogen.

EXAMPLE 4

To a suitable reaction vessel fitted as described in Example 1 having additionally a gas inlet tube and a gas exit tube is added 1160 grams of the sodium salt of 2-[3-(2-polybutenyl (980)propionic acid)] - 4 - hydroxy-6-amino-1,3,5-triazine. In 420 grams of n-propyl alcohol is added 301 grams of barium oxide at a temperature of 60 to 100° C. The temperature is heated to reflux for one hour and is treated at this same temperature for solution. The mixture is then heated to 125° C. at a retwo hours while passing carbon dioxide through the duced pressure of 18 mm. and then filtered.

EXAMPLE 5

To a suitable reaction vessel fitted as described in Example 1 having additionally a gas inlet tube and a gas exit tube is added 1480 grams of the sodium salt of 2-[3-(2-polybutenyl (1300) propionic acid)]-4 - hydroxy-6-amino-1,3,5-triazine. In 420 grams of n-propyl alcohol is added 301 grams of barium oxide at a temperature of 70° C. The temperature is heated to reflux for one hour and is treated at this same temperature for two hours while passing carbon dioxide through the solution. The mixture is then heated to 115° C. at a reduced pressure of 14 mm. and then filtered.

EXAMPLE 6

To a suitable reaction vessel fitted as described in Example 1 having additionally a gas inlet tube and a gas exit tube is added 1530 grams of the sodium salt of 2-[3-(2-polybutenyl (1350) propionic acid)]-4-hydroxy-6-amino-1,3,5-triazine. In 420 grams of n-propyl alcohol is added 301 grams of barium oxide at a temperature of 60 to 100° C. The temperature is heated to reflux for one and one-half hours and is treated at this same temperature for three hours while passing carbon dioxide through the solution. The mixture is then heated to 125° C. at a reduced pressure of 18 mm. and then filtered.

EXAMPLE 7

To a suitable reaction vessel is charged 200 parts of the triazine compound of Example 1 diluted with 250 grams of n-heptane. To this mixture is then charged 21 grams of sodium hydroxide in 100 ml. of water. The mixture is stirred at a temperature of 80° C. for a period of three hours. The temperature is then reduced to 25° C. and the product washed three times with one liter of water. The solvent is then removed at a temperature of 70° C. at a reduced pressure of 5 mm.

The following products were prepared utilizing the procedure of Example 1. These products together with the nitrogen-containing compound used and the mole ratio of polybutenylsuccinic anhydride to nitrogen-containing group are given for Examples 8 through 16 in Table I.

TABLE I

| Ex. No. | Molecular Weight of Polybutenyl Group | Nitrogen-Containing Compound | Mole Ratio Polybutenyl-succinic Anhydride to Nitrogen-Containing Group |
|---|---|---|---|
| 8 | 980 | Aminoguanidine | 1:1 |
| 9 | 1,300 | ----do---- | 1:1 |
| 10 | 980 | ----do---- | 2:1 |
| 11 | 980 | N-n-butylguanidine | 1:1 |
| 12 | 980 | N-dodecylguanidine | 1:2 |
| 13 | 980 | N,N-di-n-butylguanidine | 1:1 |
| 14 | 980 | N-cyclohexylguanidine | 1:1 |
| 15 | 980 | Guanylurea | 2:1 |
| 16 | 980 | N-n-butylurea | 1:1 |

Example 17

To a conventional glass reactor, fitted with an agitator, raw material inlet, product outlet, reflux condenser, Dean-Stark trap, heating means and thermometer is charged a mixture of 84 grams (160 milliequalivalents) of a polyisobutene-substituted succinic anhydride (average molecular weight about 1050), 13.5 grams (0.16 mole) of cyanoguanidine and 25 ml. of toluene. The temperature of the mixture is maintained at the reflux temperature of toluene for a period of 14 hours. Water is collected during the reflux period. The temperature is allowed to reach room temperature and the product is filtered. The toluene is stripped under vacuum and the product is diluted with 74 grams of oil.

The triazines of this invention were tested for detergency effectiveness in lubricating oil formulations by screening in a test referred to as "Lacquer Deposition" test. This test involves passing burned gasoline fumes through a sample formulation in a suitable container under controlled conditions, after which the sample is aged in an oven. The amount of deposit is then determined after washing away the oil. A control formulation is run simultaneously. The results are reported in terms of percent reduction in deposits, which percent is determined by dividing the amount of deposits when a detergent is present by the amount of deposits when no detergent is present. The Lacquer Deposition Test has proved to be of great value since the results obtained correlate extremely well with the results which are obtained in FL–2 (CRC) test. Thus, since the triazines of this invention show very high detergency in the Lacquer Deposition Tests, as will be noted from reference to the table below, FL–2 tests using such triazines would be expected to have total ratings of the order of 90–95 or higher. Utilizing the above-described tests, the results presented in Table II, below were obtained.

TABLE II

| Example No. | Concentration of Reaction Product in Lubricating Oil Compositions | LTD Percent Reduction |
|---|---|---|
| 1 | 2 | 90 |
| 2 | 2 | 86 |
| 3 | 1 | 88 |
| 8 | 2 | 45 |
| 9 | 2 | 43 |
| 10 | 2 | 47 |
| 11 | 2 | 48 |
| 12 | 2 | 3 |
| 13 | 2 | 3 |
| 15 | 2 | 18 |
| 16 | 2 | 0 |
| 17 | 1 | 25 |

From the above, it is clear that the addition to lubricating oils of the triazines of the present invention brings with it a clear improvement of the dispersing and/or detergent qualities of said oils.

In addition Table II clearly demonstrates that the triazine compounds as a class are far superior in effectiveness as detergents than corresponding products derived from compounds having a similar structure to that of dicyandiamide. In particular, Table II demonstrates that products derived from amino guanidine, dodecylguanidine and guanylurea are inferior in effectiveness when compared to the triazine compounds of this invention. In addition to the above, Table II demonstrates that the monotriazines of this invention have outstanding detergent performance when compared to a product formed by the reaction of two moles of dicyandiamide with an alkenylsuccinic anhydride. Thus, Examples 3 and 17 in Table II when compared demonstrate that the monotriazine compounds have over 300% greater effectiveness than a product prepared as illustrated in Example 17. From the above, it is clear that the monotriazine compounds prepared from dicyandiamide clearly have outstanding detergent performance in comparison to other products which are derived from similar nitrogen-containing compounds.

The triazines of this invention can be used in lubricating oil compositions in amounts of from about 0.05% to about 25% by weight, and in the case of additive concentrates, from about 15% to about 85% by weight. It has been found, however, that for most applications, a greatly improved detergent-dispersant effects can be obtained by the use in lubricating oil compositions of amounts of from about 0.5% to about 10% by weight. The compounds of this invention can also be used in fuel oils and various light products such as gasoline wherein they also function as detergents.

Lubricating oils which can be used as the base oils to which the new compounds of this invention are added are not limited as far as the detergent-dispersant effects are concerned, and, accordingly, lubricating oils which are of a naphthenic base, paraffinic base or other hydrocarbon base, as well as lubricating oils derived from coal products and synthetic oils, such as the alkylene polymers, alkylene oxide polymers, olefin-chlorinated hydrocarbon polymers, dicarboxylic acid esters, alkylated benzenes, silicate esters, silicon polymers, and the like, are suitable.

Since the greater part of the commercial lubricating oils sold today are subject to a large number of uses, and it is, therefore, generally necessary to employ more than one type of additive in a finished lubricant composition. Thus, although the products of the present invention are effective detergents-dispersants, it is frequently necessary to use such products in combination with other types of additives, such as metal-containing detergents and/or dispersants, corrosion inhibitors, oxidation inhibitors, extreme pressure agents, viscosity index improvers, pour-point depressors, antifoaming agents, and the like.

A particularly useful combination of additives intended to be applied in motor lubricants is the combination of an additive of the present invention and a metal-containing derivative of phosphorus such as a metal phosphorodithioate, e.g., zinc dihexyl phosphorodithioate, the zinc salt of mixed alkyl phosphorodithioates where the alkyl groups are obtained, for example, from an equal mixture of isobutyl and n-amyl alcohols, and the metal salts of phorphorus sulfide-olefin polymer reaction products and combinations thereof.

While this invention has been described with reference to various specific examples and embodiments, it is understood that the invention is not limited thereto and that it can be variously practiced within the scope of the following claims.

What is claimed is:

1. A composition comprising a major amount of a lubricating oil and a minor amount of a triazine compound represented by the structure

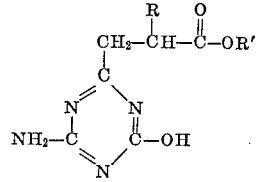

where R is a polyalkenyl radical having a molecular weight of from about 800 to about 2500 and R' is selected from the group consisting of hydrogen, a hydrocarbon radical, a quaternary ammonium cation, Group I metal cation and a Group II metal cation.

2. A composition of claim 1 wherein R' is a hydrocarbon radical having from 1 to 30 carbon atoms.

3. A composition of claim 1 wherein R' is a hydrocarbon radical having from 1 to 8 carbon atoms.

4. A composition of claim 1 wherein R is a polyalkenyl radical having from 1100 to 2000 molecular weight and R' is hydrogen.

5. A composition of claim 1 wherein R is a polyalkenyl radical having a molecular weight of from 1100 to 1500.

6. A composition of claim 1 wherein R' is selected from the group consisting of hydrogen, hydrocarbyl having from 1 to 8 carbon atoms and a Group II metal cation wherein the Group II metal is selected from the group consisting of calcium and barium.

7. A composition of claim 6 wherein the Group II metal cation has a bacicity greater than the neutral Group II metal cation.

References Cited
UNITED STATES PATENTS

| | | | |
|---|---|---|---|
| 3,219,666 | 11/1965 | Norman et al. | 252—51.5 |
| 3,338,831 | 8/1967 | Elliott et al. | 252—51.5 |

PATRICK P. GARVIN, *Primary Examiner.*